May 18, 1954     E. G. SEILBERGER     2,678,809
ELECTRIC BLENDING MACHINE
Filed Sept. 18, 1952     3 Sheets-Sheet 1
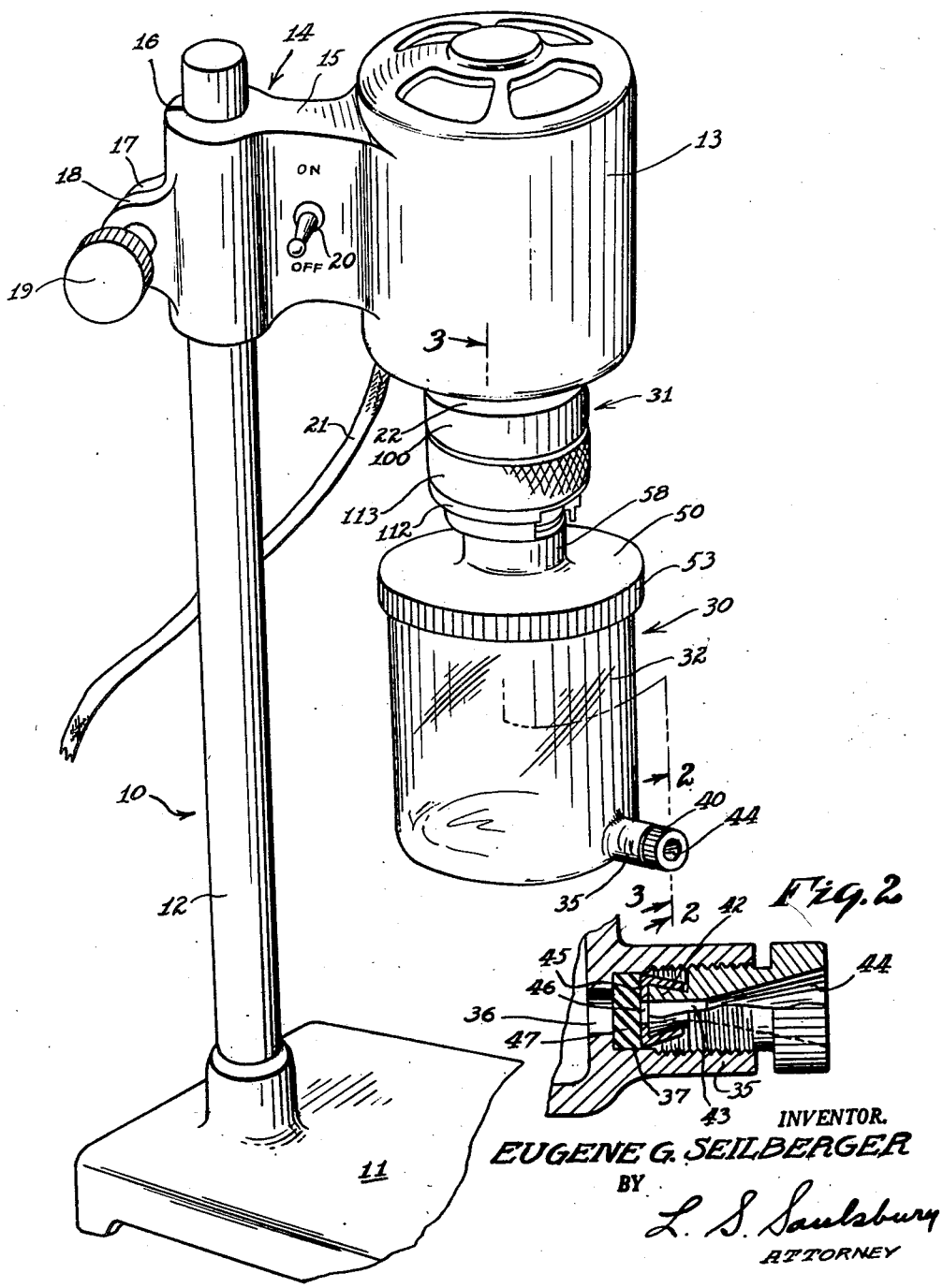
INVENTOR.
EUGENE G. SEILBERGER
BY
L. S. Saulsbury
ATTORNEY May 18, 1954   E. G. SEILBERGER   2,678,809
ELECTRIC BLENDING MACHINE
Filed Sept. 18, 1952   3 Sheets-Sheet 2
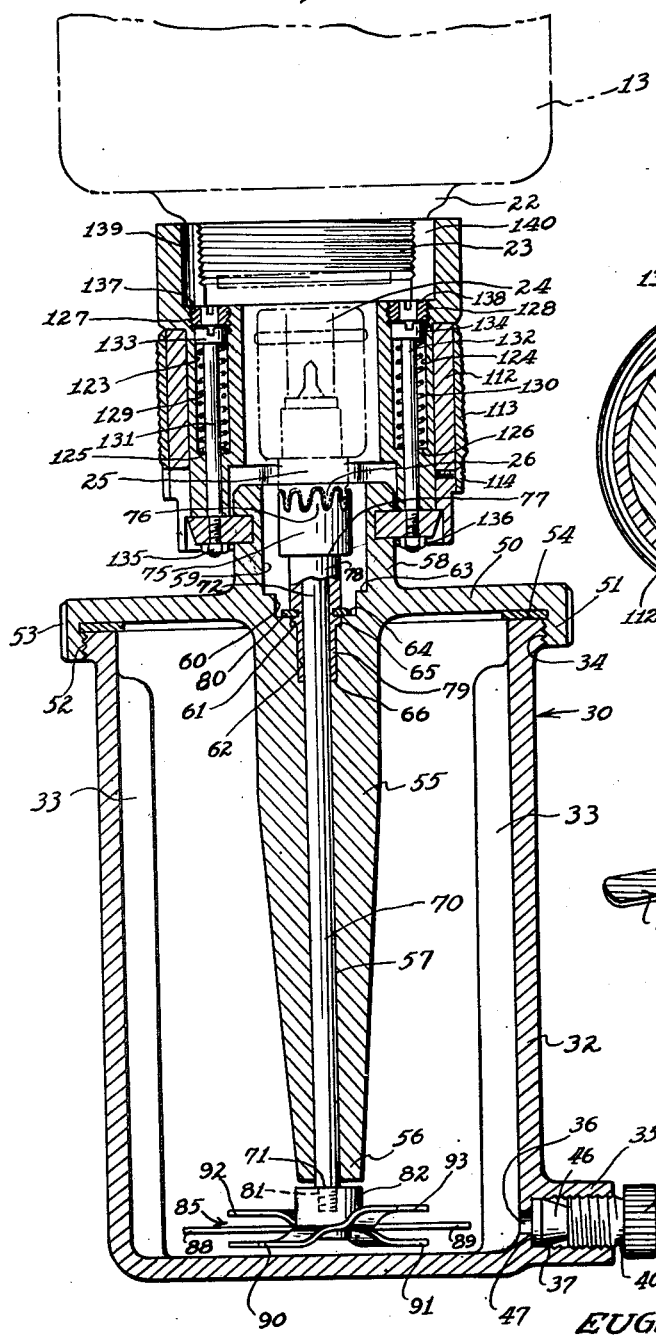
Fig. 3
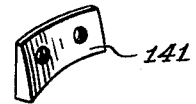
Fig. 11
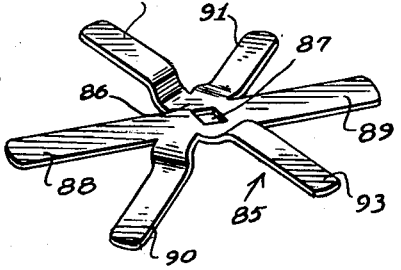
Fig. 12
Fig. 13
INVENTOR.
EUGENE G. SEILBERGER
BY
L. S. Saulsbury
ATTORNEY May 18, 1954　　　E. G. SEILBERGER　　　2,678,809
ELECTRIC BLENDING MACHINE
Filed Sept. 18, 1952　　　3 Sheets-Sheet 3
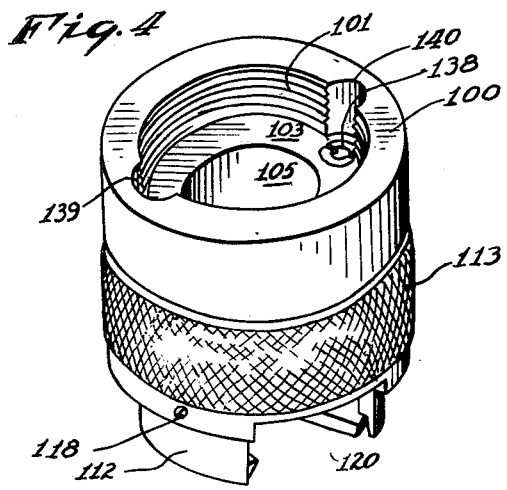
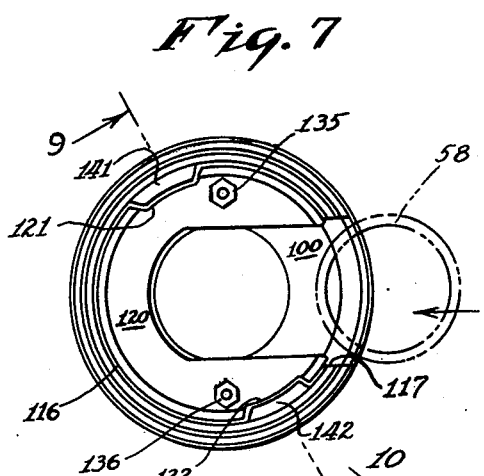
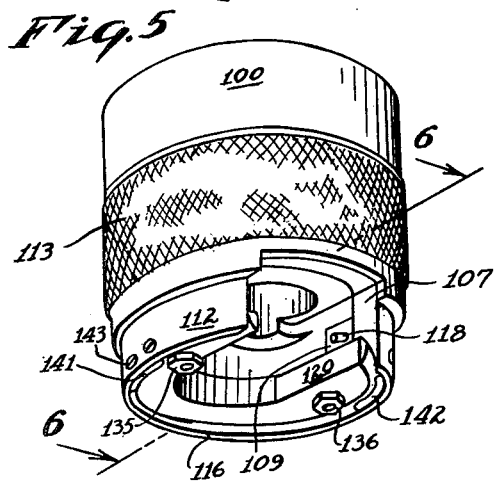
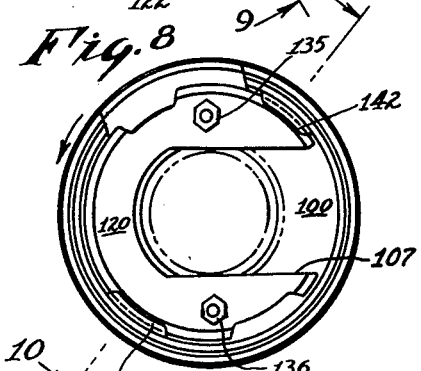
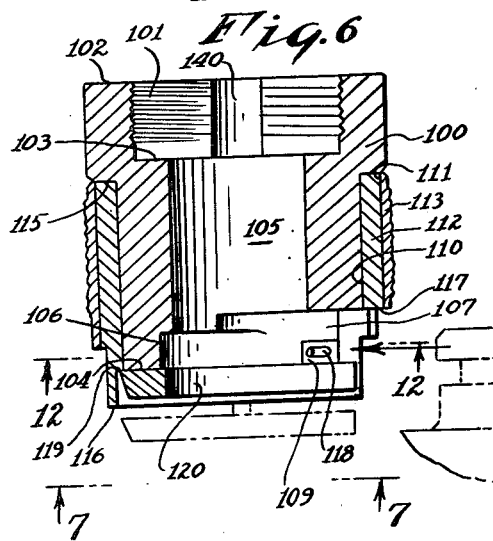
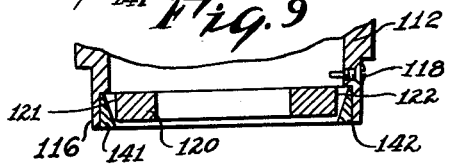
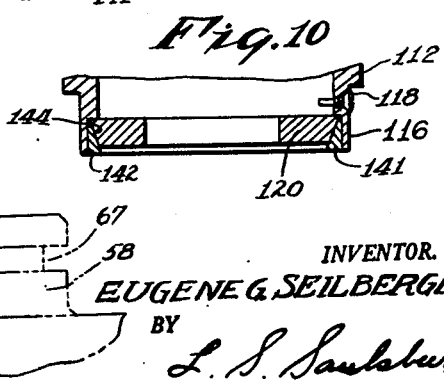
INVENTOR.
EUGENE G. SEILBERGER
BY
L. S. Saulsbury
ATTORNEY Patented May 18, 1954

2,678,809

UNITED STATES PATENT OFFICE 2,678,809

ELECTRIC BLENDING MACHINE

Eugene G. Seilberger, Jackson Heights, N. Y.

Application September 18, 1952, Serial No. 310,177

8 Claims. (Cl. 259—108)

This invention relates to blenders and more particularly to blenders for liquifying and blending biological tissue.

It is well known in the art that biological tissue is required to be blended prior to examination, and in certain cases it is required that the blending is done under conditions of extreme cold. The devices of the prior art have failed to satisfactorily fulfill this requirement.

Accordingly, it is a primary object of the present invention to provide a simple and efficient means for liquifying and blending biological tissue under desired conditions of temperature.

It is another object of the present invention to provide means for withdrawing material from the blender without opening the latter.

It is a further object of the present invention to provide a blender which is characterized by a novel agitator or rotary blade.

It is a further object of the present invention to provide a blender which includes an open top container, a cover for the container having a rotary blade mounted therein, a quick detachable support engageable with the cover, and drive means operatively connected to the blade.

It is yet a further object of the present invention to provide a blender of the type described which is simple and durable, which is effective for its intended purposes and which can be manufactured and sold at a reasonable cost.

For other objects and for a better understanding of the invention, reference may be had to the following detailed description taken in connection with the accompanying drawings, in which:

Figure 1 is a perspective view of a device constructed in accordance with the present invention, showing a preferred form of mount and drive means;

Fig. 2 is a sectional view taken on the line 2—2 of Fig. 1;

Fig. 3 is a sectional elevational view taken on the line 3—3 of Fig. 1;

Fig. 4 is a top perspective view of the connector shown in Fig. 1;

Fig. 5 is a bottom perspective view of the connector;

Fig. 6 is a sectional view taken on the line 6—6 of Fig. 5 and showing, in dotted outline, a portion of the container cover;

Fig. 7 is a bottom view of the connector showing the latter in position for receiving the container cover;

Fig. 8 is a bottom view of the connector showing the latter in position for holding the container cover;

Fig. 9 is a fragmentary sectional view taken on the line 9—9 of Fig. 7;

Fig. 10 is a fragmentary sectional view taken on the line 10—10 of Fig. 8;

Fig. 11 is a perspective view of a wedge removed from the connector;

Fig. 12 is a sectional view taken on the line 12—12 of Fig. 6; and

Fig. 13 is a perspective view of the blade, as removed from its mounting.

Referring now more particularly to the drawings, 10 represents generally a mounting having a base 11 which is adapted to rest upon a horizontal surface (not shown). Mounted on the base 11 is a vertically disposed rod or upright 12 which supports a motor 13 through the bracket 14. The bracket 14 includes an arm 15 extending laterally outwardly from the motor 13 and having its outer end adapted to slidably receive the upright 12. The arm 15 is formed with a through slot 16 and ears 17 and 18 on opposite sides of the slot. Extending through the ears 17 and 18 is a bolt 19 which effects movement of the ears toward and away from each other, whereby the arm 15 may be clamped to the upright 12 at any selected position therealong. On the arm 15 is a switch 20 for connecting and disconnecting the motor 13 to a source of electric power (not shown) through the wire 21.

The motor 13 is provided with a downwardly extending neck 22, the latter having an externally threaded portion 23. A drive shaft 24 projects downwardly through the neck 22 and is provided with an extension 25. The drive shaft extension 25 has its outer end formed with longitudinally extended corrugations or teeth 26.

In order to mount the blender, generally designated 30, for operative connection to the motor 13, a coupling or connector 31 is arranged intermediate and connected to the blender and the motor.

The blender 30, best shown in Fig. 3, includes a jar or container 32 having vertically extending spaced ribs 33 on its inner surface. The container 32 is open at its top and provided with an externally threaded portion 34 adjacent its upper end. Adjacent its lower end the container is formed with a laterally extending internally threaded neck 35 and an opening 36 extending through the container wall centrally of the neck 35. The neck 35 is formed with a reduced portion 37 adjacent the opening 36.

A threaded plug 40 having a knurled edge 41 on one end and a conical extension 42 on the other end is threadably insertable into the neck 35. The plug 40 is provided with a longitudinally extending through bore 43 having an outwardly flared opening 44. On the conical extension 42 is rotatably mounted a cap 45 which has an aperture 46 in registry with the bore 43. Seated within the reduced portion 37 and held therein by cap 45 is a closure disc or seal 47.

While the container 32 is preferably fabricated of aluminum, any material having the requisite strength and heat conductivity may be used. It is proposed to make the plug 40 and cap 45 of metal, but it is appreciated that plastic or other suitable material may be substituted. The closure 47 is preferably fabricated of self-sealing rubber, as it is contemplated to insert a hypodermic syringe through the bore 43, aperture 46 and seal 47 for withdrawing a quantity of the contents of the container 32.

Closing the open top of the container 32 is a cover 50 having a depending peripheral flange 51 formed with an internally threaded portion 52 and external serrations 53. The threaded portion 52 of flange 51 is engageable with the threaded portion 34 of container 32 and a gasket 54 is insertable between the cover and the container to seal the latter. Depending from the underside of cover 50 is an elongated member 55 which tapers towards its free end 56 and which is provided with a longitudinally extending through bore 57. On the upper side of cover 50 concentrically with the member 55 is an upstanding collar or sleeve portion 58. The sleeve portion 58 is formed with a longitudinally extending bore 59 having a first reduced portion 60, a second reduced portion 61, a third reduced portion 62, the reduced portions forming shoulders 63, 64, 65 and 66 respectively. The reduced portion 62 opens into the bore 57 to provide an opening extending through the sleeve portion 58 and member 55. The sleeve portion 58 is formed externally with an annular groove 67 for a purpose to be described hereinafter.

Mounted rotatively in the bore 57 is a shaft 70 having one end 71 projecting beyond the end 56 of member 55 and having the other end 72 extending into the bore 59. The upper end 72 of shaft 71 is provided with a cylindrical member 75 having longitudinally extending teeth 76 on one end thereof, the member 75 being fixedly secured to the shaft 70 by any suitable means (not shown). Extending from the inner end 77 of member 75 and surrounding the shaft 70 are the reduced portions 78 and 79, which rotatably seat upon the shoulders 65 and 66, respectively. A washer 80 is secured on the portion 78 and rotatively seats on the shoulder 64. Thus, the shaft 70 and cylindrical member 75 are mounted for rotative movement in the bore 57 and prevented from falling through the latter.

The lower end 71 of shaft 70 is provided with an externally threaded portion 81 for reception in the body 82. The body 82 is fixedly secured to the rotary blade or agitator 85 by any suitable means (not shown). The agitator 85 is formed with a hub 86 having a rectangular opening 87 extending therethrough. On the hub 86 are a first pair of oppositely extending coplanar projections or blades 88 and 89, Figs. 3 and 13. A second pair of opposite extending coplanar blades 90 and 91 are each spaced 60 degrees from the blades 88 and 89 respectively, and are in a plane parallel to and spaced below the plane of the latter named blades. A third pair of coplanar opposite extending blades 92 and 93 are each spaced 60 degrees from the blades 88 and 89 respectively and are in a third parallel plane to and spaced from the plane of blades 90 and 91. In its preferred form, the agitator 85 is made from a single sheet of corrosion resistant metal, but it is appreciated that the agitator could be constructed in other ways and be within the scope of this invention.

In order to support the blender in an operative position, a connector or support 31 has been provided which has one end attached to the neck 22 of the motor 13 and the other end attached to the sleeve portion 58 of the cover 50. The connector or support 31 includes a cylindrical member 100 having a threaded bore 101 extending inwardly from one end 102 and terminating in an end wall 103, Fig. 6. Extending inwardly through the end wall 103, centrally thereof, and opening through the other end 104 of the cylindrical member 100 is a reduced bore 105 which increases at 106 adjacent the end 104. Extending laterally inwardly through the cylindrical member 100 adjacent to an opening through the end 104 is a cut out portion 107. Also formed in the cylindrical member 100 are a pair of opposed notches 108 and 109 which open through the end 104 and into the cut out 107. The external diameter of the cylindrical member 100 is reduced at 110 whereby a shoulder 111 is formed. Slidable over the reduced portion 110 is a cylindrical sleeve 112 having a knurled covering 113. The covering 113 is secured to the sleeve 112 by a threaded fastener 114. The upper end 115 of the sleeve 112 abuts the shoulder 111 and the lower end 116 extends beyond the lower end 104 of cylindrical member 111. The sleeve 112 and the covering 113 are cut away at 117 conformably with the cut out portion 107 of the cylindrical member 100, whereby, a transverse opening is provided into the bore 105, which may be opened and closed upon rotative movement of the sleeve 112 about the cylindrical member 100. For limiting the rotative movement of the sleeve 112, a pin 118 extends through the sleeve 112 and is movable therewith into the notches 108 and 109, Fig. 12. The sleeve 112 is provided with a downwardly facing shoulder 119 adjacent to and spaced from the lower end 116.

Arranged abutting the lower end 104 of the cylindrical member 100 and the shoulder 119 of the sleeve 112 is a horizontally disposed U-shaped member 120 having spaced side arms 120' and 120''. The U-shaped member 120 is formed with a pair of opposed elongated notches 121 and 122, and is resiliently held in abutting relation with the end 104. The cylindrical member 100 is provided with a pair of oppositely disposed longitudinally extending bores 123 and 124 which extend inwardly through the wall 103 and open through the bottom end 104. The bores 123 and 124 are provided with upwardly facing shoulders 125 and 126 and threaded portions adjacent their upper ends 127 and 128. Springs 129 and 130 are inserted into the bores 123 and 124, respectively, bolts 131 and 132 are inserted with their threaded ends downwardly into the bores 123 and 124, respectively, through the springs 129 and 130, respectively, and through the U-shaped member 120. The springs 129 and 130 will then have their opposite ends engaging the shoulder 125 and bolt head 133, and shoulder 126 and bolt head 134 respectively. On the threaded ends of bolts 131 and 132 are respectively secured nuts 135 and 136 to maintain the U-shaped member at a predetermined distance from the bolt heads 133 and 134. Threaded into the threaded portions 127 and 128 of bores 123 and 124 are screws 137 and 138, and the threaded portion 101 of cylindrical member 100 is provided with longitudinally extending opposing grooves 139 and 140 to provide access to the screws 137 and 138, Fig. 4. Thus, the U-shaped member 120 is resiliently mounted in abutting relation with respect to the cylinder end 104 and the shoulder 119, and has its open portion positioned adjacent the cutout portion 106. That is, the U-shaped member 120 may be moved downwardly against the force of springs 129 and 130 and the sleeve portion 58 of cover 50 may be inserted through the open end of the U-shaped member with a groove 64 of the sleeve portion 58 slidably receiving the adjacent portions of the U-shaped member. The U-shaped member 120 and sleeve portion 58 may now be allowed to move upwardly so that the teeth 76 of member 75 and the teeth 26 of member 25 will inter-engage to form a driving connection.

In order to securely hold the U-shaped member 120 against the end 104 of cylindrical member 100 a pair of curved wedges 141 and 142 are fixedly secured by threaded fasteners 143 within the sleeve 112 adjacent its lower end 116. The U-shaped member is movable downwardly only when the notches 121 and 122 are in registry with the wedges 141 and 142. These wedges taper upwardly and engage with the downwardly tapering outer edge 144 of the U-shaped member 120.

In operation, the support or connector 31 is attached to the motor 13 by screwing the cylindrical member 100 on to the threaded portion 23 of neck 22. The plug 40 is screwed into the neck 35 to hold the seal 47 firmly in place. The cap 46 is rotatable with respect to the plug extension 42 to reduce wear upon the seal. After a quantity of material to be operated upon is placed in the container 32, the gasket 54 is placed on the upper end of the container and the cover 50 is screwed on to the threaded portion 34 of the container. The sleeve 112 is rotated to position its cutout portion 117 adjacent the cutout portion 107 of the cylindrical member 100. In this position, the U-shaped member 120 with the annular groove 67 may be rotated, moving by the wedges 141 and 142, and the sleeve portion 58 of cover 50 is inserted into the U-shaped member 120 with the annular groove 67 receiving adjacent portions of the U-shaped member. The U-shaped member is then raised so that the teeth 76 will inter-engage with the teeth 26, and the sleeve 112 rotated to close the cutout portion 107 and to position the wedges 141 and 142 against the U-shaped member 120 to firmly hold the latter. The bracket 14 may be moved along the upright 12 to any desired position and the bolt 19 turned to secure the bracket at the desired position.

If it is desired to maintain the biological tissue at a particular temperature, the container 30 may be held at the desired temperature without affecting the operation of the motor 13. For example, the container 30 may be immersed in an ice solution or a heated solution.

The switch 20 may now be turned on which will effect rotation of the drive shaft 24 which will, through the members 25 and 75 cause rotation of the shaft 70 and agitator 85. The particular construction of the agitator has proved to more quickly and effectively liquidize and blend the tissue. The agitator 85 causes the material to move outwardly and it is guided upwardly by the ribs 33, it then moves downwardly along the member 55 and is recirculated in like manner. When it is desired to remove a sample of the material from within the container 32, it is only necessary to insert a hypodermic syringe through the plug 40 and seal 47 into the container 32 and withdraw the material therefrom.

From the foregoing, it is seen that a blender is provided which permits the blending of material at any desired temperature, and which permits the removal of material from the blender without opening the latter.

It has also been seen that the device of the present invention is characterized by a novel connector for supporting the blender and coupling the blender rotor to a drive means. It is also apparent that a blender has been provided which is characterized by a novel and highly improved agitator.

Thus, it is seen that the intended objects of the invention are achieved, and that a device is provided which is adapted to meet the conditions of practical use.

While various changes may be made in the detail construction, it shall be understood that such changes shall be within the spirit and scope of the present invention as defined by the appended claims.

What is claimed is:

1. A blender comprising a container having an open top, a cover for the open top of said container and detachably secured thereto, an agitator depending from said cover and mounted for rotative movement relative thereto, a connector arranged above said cover having its upper end adapted for attachment to a supporting fixture and having its lower end detachably connected to said cover and drive means extending through said connector and detachably connected to said agitator, an upstanding sleeve portion on said cover, a pair of spaced arms mounted in said connector and inter-engageable with said sleeve portion, said arms being mounted for movement into said connector for holding said sleeve portion and out of said connector for receiving and releasing said sleeve portion, and means on said connector and engageable with said arms for locking the sleeve portion within said connector.

2. A blender comprising a container having an open top, a cover for the open top of said container and detachably secured thereto, an agitator depending from said cover and mounted for rotative movement with respect thereto, a connector arranged above said cover having its upper end adapted for attachment to a supporting fixture and having its lower end detachably connected to said cover and drive means extending through said connector and detachably connected to said agitator, an upstanding sleeve portion on said cover, a pair of spaced arms mounted in said connector and inter-engageable with said sleeve portion, said arms being mounted for movement into said connector for holding said sleeve portion and out of said connector for receiving and releasing said sleeve portion, and means on said connector and engageable with said arms for locking the latter within said connector, said last named means including a pair of oppositely disposed curved wedges.

3. A blender comprising a container having an open top, a cover for the open top of said container and detachably secured thereto, an agitator depending from said cover and mounted for rotative movement with respect thereto, a connector arranged above said cover having its upper end adapted for attachment to a supporting fixture and having its lower end detachably connected to said cover, and drive means extending through said connector and detachably connected to said agitator, said cover having an upstanding sleeve portion insertable into said connector and detachably secured therein, said agitator comprising an elongated member depending from said cover and having a longitudinal bore extending therethrough, a shaft rotatably mounted in said bore, one end of said shaft extending into said sleeve portion and the other end of said shaft projecting beyond said elongated member, and a rotary blade on said other end of said shaft.

4. A blender comprising a container having an open top, a cover for the open top of said container and detachably secured thereto, an agitator depending from said cover and mounted for rotative movement, a connector arranged above said cover having its upper end adapted for attachment to a supporting fixture and having its lower end detachably connected to said cover, and drive means extending through said connector and detachably connected to said agitator, an upstanding sleeve portion on said cover, a U-shaped member mounted in said connector and removably out of said connector for embracing the said collar and receiving same and movable into said connector for holding said collar.

5. A blender comprising a container having an open top, a cover for the open top of said container and detachably secured thereto, an agitator depending from said cover and mounted for rotative movement, a connector arranged above said cover having its upper end adapted for attachment to a supporting fixture and having its lower end detachably connected to said cover, and drive means extending through said connector and detachably connected to said agitator, an upstanding sleeve portion on said cover, a U-shaped member mounted in said connector and removable out of said connector for embracing the said sleeve portion and receiving same and movable into said connector for holding said sleeve portion, and means for locking said U-shaped member within said connector.

6. A blender comprising a container having an open top, a cover for the open top of said container and detachably secured thereto, an agitator depending from said cover and mounted for rotative movement, a connector arranged above said cover having its upper end adapted for attachment to a supporting fixture and having its lower end detachably connected to said cover, and drive means extending through said connector and detachably connected to said agitator, an upstanding sleeve portion on said cover, a U-shaped member mounted in said connector and removably out of said connector and for embracing the said sleeve portion and receiving same and movable into said connector for holding said sleeve portion, and means for locking said U-shaped member within said connector, said last named means comprising a pair of opposed wedges engageable with the peripheral edge of said U-shaped member.

7. A blender comprising an upright support having a laterally-extending bracket thereon, an electric motor on said laterally-extending bracket and having a depending drive shaft with a coupling member on its lower end, a connector fixed to the motor and surrounding said depending drive shaft, a container having a top closure member with upwardly-extending sleeve portion thereon, an agitator journalled on said top closure member and extending downwardly into the container and having a drive means extending upwardly into the sleeve portion of the closure member and with a complementary coupling member thereon lying within the sleeve portion, said sleeve portion having an annular groove, said connector comprising a cylindrical body having an opening at its lower end, a U-shaped member and resilient means urging said U-shaped member against the lower end of the cylindrical member, said U-shaped member being opened adjacent to the side opening of the cylindrical member and adapted to cooperate with the groove of the sleeve portion whereby to retain the container upon the connector and motor assembly, said U-shaped member being movable downwardly against the action of the resilient means to permit the engagement of the coupling member of the agitator with the coupling member of the depending motor drive shaft.

8. A blender as defined in claim 7 and said connector further having a locking sleeve rotatably mounted on the exterior of said cylindrical member and having an opening registerable with the openings of the cylindrical member and the U-shaped member to permit the insertion of the container sleeve portion into the connector but turnable to close off the openings of the cylindrical member and the U-shaped member to hold the container against lateral displacement from the connector, and said locking sleeve having wedge means engageable with the underside of the U-shaped member to positively lock the U-shaped member against the lower end of the cylindrical member and against downward displacement therefrom when the sleeve is turned to close off the openings in the cylindrical body and U-shaped member and to thereby maintain the driving connection between the agitating shaft and the depending shaft of the motor.

References Cited in the file of this patent

UNITED STATES PATENTS

| Number | Name | Date |
|---|---|---|
| 1,431,715 | Wolters | Oct. 10, 1922 |
| 1,503,943 | Flegel | Aug. 5, 1924 |
| 1,713,119 | Flegel | May 14, 1929 |
| 1,735,143 | Supervielle | Nov. 12, 1929 |
| 2,021,626 | Flegel | Nov. 19, 1935 |
| 2,611,588 | Kelley et al. | Sept. 23, 1952 |